United States Patent
Holderried et al.

(10) Patent No.: US 9,994,176 B2
(45) Date of Patent: Jun. 12, 2018

(54) BUMPER MODULE

(71) Applicant: GM GLOBAL TECHNOLOGY OPERATIONS LLC, Detroit, MI (US)

(72) Inventors: Stefan Holderried, Ruesselsheim (DE); Fabian Fuerst, Ruesselsheim (DE); Tommy Hechtel, Ruesselsheim (DE); Theobald Hock, Ruesselsheim (DE)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days. days.

(21) Appl. No.: 15/449,417

(22) Filed: Mar. 3, 2017

(65) Prior Publication Data

US 2017/0253202 A1  Sep. 7, 2017

(30) Foreign Application Priority Data

Mar. 3, 2016 (DE) .................. 10 2016 002 635

(51) Int. Cl.
*B60R 19/03* (2006.01)
*B60R 19/18* (2006.01)

(52) U.S. Cl.
CPC ...... *B60R 19/03* (2013.01); *B60R 2019/1853* (2013.01); *B60R 2019/1866* (2013.01)

(58) Field of Classification Search
CPC . B60R 19/03; B60R 19/18; B60R 2019/1833; B60R 2019/1866; B60R 2019/1873; B60R 2019/188; B60R 2019/1853
See application file for complete search history.

(56) References Cited

U.S. PATENT DOCUMENTS

| | | | | |
|---|---|---|---|---|
| 4,542,925 A * | 9/1985 | Huber | ................... | B60R 19/18 293/109 |
| 5,788,297 A * | 8/1998 | Sugawara | .............. | B60R 19/18 293/102 |
| 5,804,511 A * | 9/1998 | Kelman | ............... | B29C 67/246 442/172 |
| 6,669,252 B2 * | 12/2003 | Roussel | ................. | B60R 19/18 293/120 |
| 9,487,168 B2 * | 11/2016 | Yabu | ...................... | B60R 19/18 |
| 9,604,586 B2 * | 3/2017 | Nickel | .................... | B60R 19/03 |
| 9,610,909 B2 * | 4/2017 | Richeton | ................ | B60R 19/03 |
| 2003/0052493 A1* | 3/2003 | Ponsonnaille | ........ | B60D 1/488 293/102 |
| 2003/0227184 A1* | 12/2003 | Evans | ..................... | B60D 1/52 293/120 |
| 2007/0182170 A1* | 8/2007 | Renault | ................... | B60D 1/56 293/102 |

(Continued)

FOREIGN PATENT DOCUMENTS

DE 102009035777 A1 2/2011
DE 102014011790 A1 2/2016

OTHER PUBLICATIONS

German Patent Office, German Search Report for German Patent Application No. 10 2016 002 635.9 dated Jan. 27, 2017.

*Primary Examiner* — Gregory A Blankenship
(74) *Attorney, Agent, or Firm* — Lorenz & Kopf LLP

(57) ABSTRACT

A bumper module for a vehicle includes a cross beam and two fastening flanges for fastening the cross beam to a longitudinal body beam. A layer included of fiber-reinforced plastic extends continuously from the cross beam until into the fastening flange.

17 Claims, 3 Drawing Sheets

(56) References Cited

U.S. PATENT DOCUMENTS

| | | | |
|---|---|---|---|
| 2010/0109354 A1* | 5/2010 | Agrahari | B60R 19/18 293/120 |
| 2011/0254295 A1* | 10/2011 | Cave | B29C 65/342 293/132 |
| 2013/0154285 A1* | 6/2013 | Jeong | B60R 19/18 293/133 |
| 2013/0175813 A1* | 7/2013 | Mana | B60R 19/18 293/120 |
| 2014/0367982 A1* | 12/2014 | Kano | B60R 19/18 293/121 |
| 2015/0015006 A1* | 1/2015 | Yabu | B60R 19/03 293/120 |
| 2015/0061320 A1* | 3/2015 | Yabu | B60R 19/18 296/187.1 |
| 2015/0137538 A1* | 5/2015 | Yoon | B60R 19/03 293/120 |
| 2016/0046248 A1* | 2/2016 | Fuerst | B60R 19/18 293/121 |
| 2016/0121827 A1* | 5/2016 | Yabu | B60R 19/18 293/120 |
| 2016/0325701 A1* | 11/2016 | Yabu | B60R 19/03 |
| 2016/0355150 A1* | 12/2016 | Yabu | B60R 19/03 |
| 2017/0036624 A1* | 2/2017 | Yabu | B60R 19/03 |
| 2017/0157863 A1* | 6/2017 | Nickel | B29C 69/02 |

\* cited by examiner

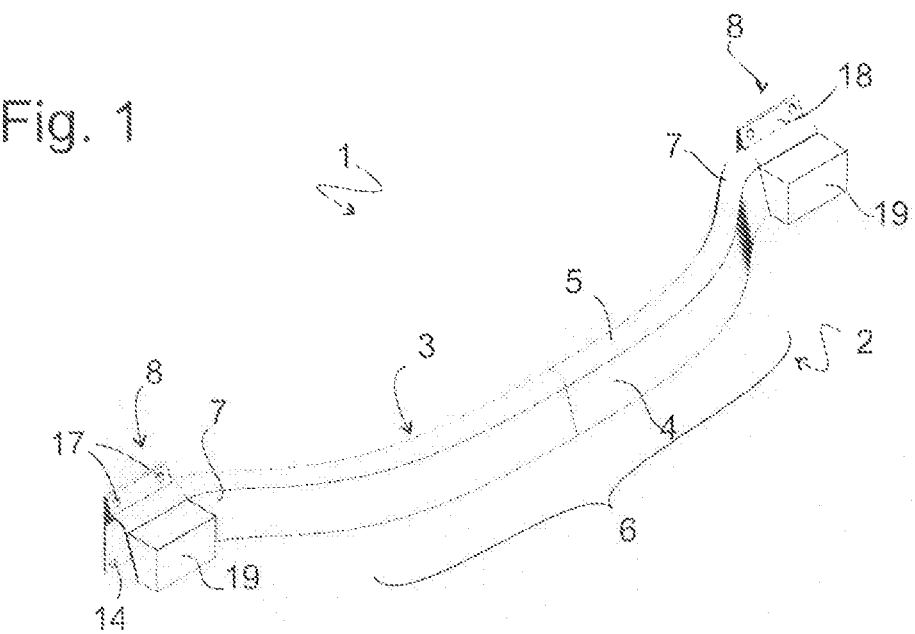
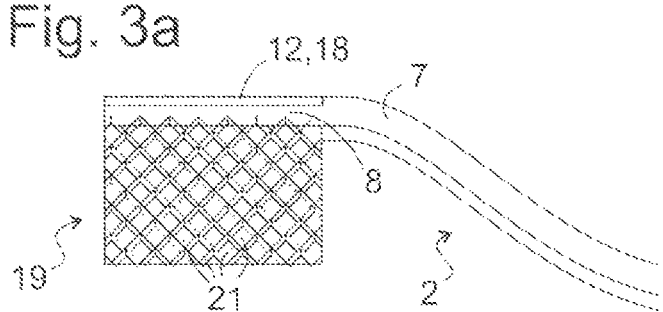
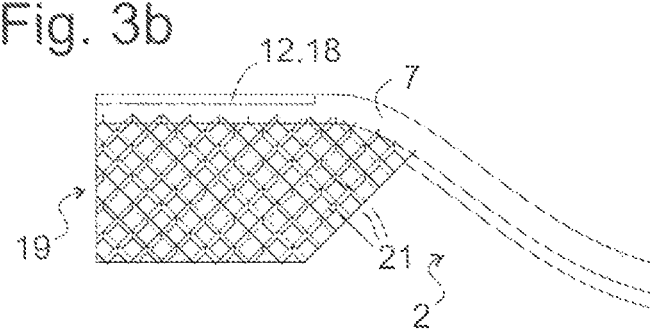
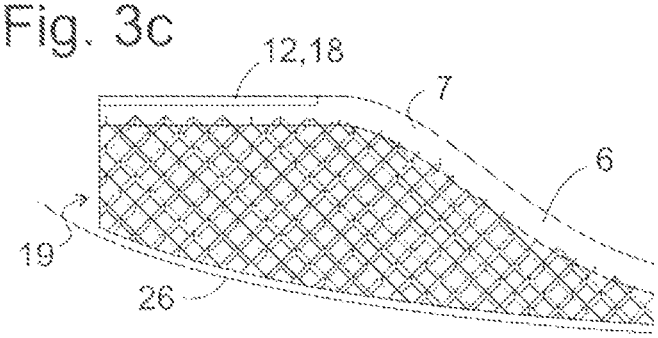

BUMPER MODULE

CROSS-REFERENCE TO RELATED APPLICATION

This application claims priority to German Patent Application No. 102016002635.9, filed Mar. 3, 2016, which is incorporated herein by reference in its entirety.

TECHNICAL FIELD

The present disclosure pertains to a bumper module for a vehicle, in particular a road vehicle, with at least one cross beam encompassing at least one layer included of fiber-reinforced plastic.

SUMMARY

The present disclosure provides a bumper module that exhibits a high load-bearing capacity at a low weight, and can still be efficiently and cost-effectively manufactured.

In one embodiment of the present disclosure, a bumper module for a vehicle includes a cross beam and two fastening flanges for fastening the cross beam to a longitudinal body beam. A layer of fiber-reinforced plastic extends continuously from the cross beam into the fastening flange. Such a layer can include a so-called organic sheet or organo sheet, which can be molded into the three-dimensional shape required for the bumper module by thermoforming. A continuous progression can be realized especially easily for the layer having fiber-reinforced plastic if the cross beam extends between the fastening flanges, adjoining flush with the latter.

In order to achieve the shock-absorbing effect required during a collision in which a foreign object hits the cross beam and divert the impact forces to the longitudinal beam, the cross beam between the fastening flanges should be outwardly bowed or bulged toward the vehicle exterior.

For purposes of a tear-resistant attachment to the longitudinal body beam, it is useful for at least one screw hole of one of the fastening flanges to cross the layer having fiber-reinforced plastic.

However, a fastening flange may be enhanced by injection molding a plastic material. In this way, fiber-reinforced plastic waste can be minimized in a segment of the fastening flange extending out over a longitudinal edge of the cross beam.

The fiber-reinforced plastic layer can be bent along a first longitudinal edge of the cross beam, so as to form at least one outer and one inner wall, and thereby elevate the load-bearing capacity of the cross beam.

Should this be the case, the fiber-reinforced plastic layer cannot extend over this longitudinal edge. In which case, it makes sense to fabricate it via injection molding so that when a flange segment is needed beyond this longitudinal edge.

The first longitudinal edge is preferably an upper edge of the cross beam. The U-profile that resulted from bending the layer is then open at the bottom, and no dirt or deposits can accumulate therein.

In order to further improve the load-bearing capacity of the cross beam, the inner and outer wall can be joined together by ribs injection molded between them.

In an alternative embodiment, the fiber-reinforced plastic layer can be formed into a groove open in the longitudinal direction of the vehicle, or into several such grooves running one next to the other. Here as well, ribs can be injection molded inside of the groove to increase the load-bearing capacity.

The depth of the groove should gradually taper from the middle of the cross beam to the fastening flanges, so as to provide a continuous transition to the fastening flanges free of highly curved or angular regions that are particularly vulnerable to failure in the event of a collision.

In the event of a collision, the upper and lower flanks of the groove tend to be upwardly or downwardly deflected by kinking when exposed to a load. In order to counter this tendency, the cross beam can exhibit a hat-shaped cross section. Having regions corresponding to the brim of the hat adjoin the flanks of the groove from above and below allows them to hamper the outward kinking of the flanks, thereby contributing significantly to the load-bearing capacity.

In order to achieve a sufficient shock-absorbing effect even when a foreign body hits the vehicle right before one of the longitudinal beams, an energy absorber can be secured to the exterior of the fastening flange.

In order to enable an efficient production, the energy absorber can be injection molded onto the fastening flange, just like the aforementioned supplemental segment.

An energy absorber with a honeycomb structure is especially suitable for injection molding.

Having the combs of the honeycomb structure be open in the vertical direction permits the use of simple molding tools with a low number of mold parts that are movable relative to each other.

BRIEF DESCRIPTION OF THE DRAWINGS

The present disclosure will hereinafter be described in conjunction with the following drawing figures, wherein like numerals denote like elements.

FIG. 1 is a perspective view of a bumper module according to a first embodiment of the present disclosure;

FIGS. 3a-c are top views of variants of an energy absorber of the bumper module from FIG. 1;

DETAILED DESCRIPTION

Figure 2:
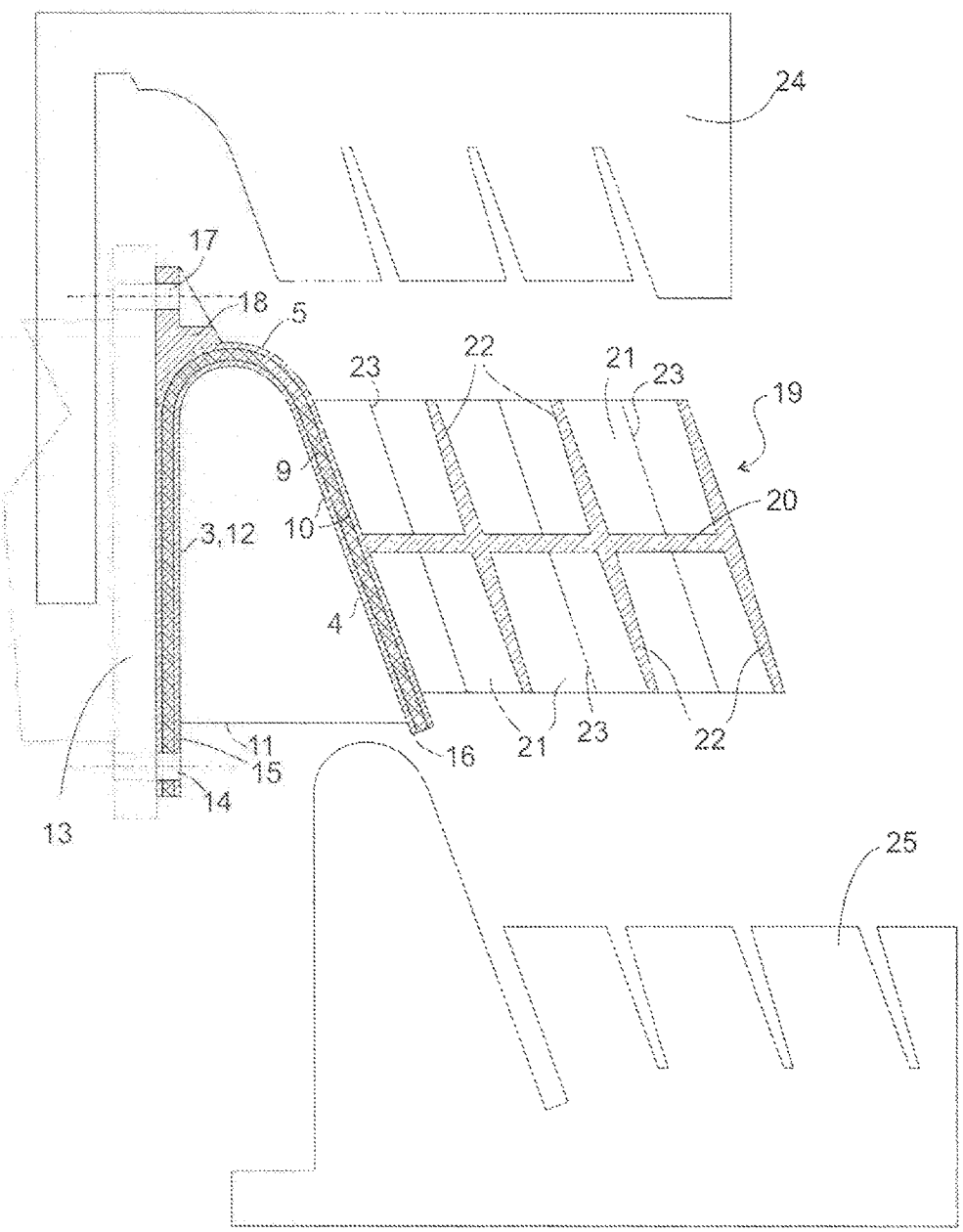
FIG. 2 is a section through the bumper module from FIG. 1.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a bumper module 1 for a motor vehicle according to a first embodiment of the present disclosure in a perspective view. A cross beam 2 of the bumper module 1 is formed as an elongated, downwardly open groove with an inner wall 3 facing the interior of the vehicle in a state mounted to the vehicle, an outer wall 4 sheathed by a bumper skin, and a rounded apex 5 that joins the inner and outer wall 3, 4 as a single piece. A central portion 6 of the cross beam 2 is convexly curved toward the vehicle exterior as viewed from above. Lateral segments 8 extending along a straight line in the transverse direction of the vehicle adjoin the central portion on either side, over short, outwardly concavely curved intermediate segments 7.

FIG. 2 shows a cross section through one of the lateral segments 8. The cross beam 2 is obtained by thermoforming a rectangular blank out of organo sheet, and an internal fiber layer 9 of the organo sheet extends continuously over the inner wall 3, apex 5 and outer wall 4. The fiber layer 9 is embedded into a matrix 10 included of thermoplastic material; on FIG. 2, the matrix 10 forms surface layers that surround the fiber layer on both sides; in practice, the fibers in the layer 9 can reach as far as the surfaces of the cross beam 2.

Injection molded over the entire width of the cross beam 2 inside of the groove are ribs 11, which integrally join the inner and outer wall 3, 4 together. The plastic including the ribs 11 is chemically identical to that of the matrix 10; at the temperature at which the ribs 11 are injection molded onto the cross beam 2, the matrix 10 is thus also soft, and can enter into an integral bond with the molded on material.

At the height of the lateral segment 8, the inner wall 3 forms a respective fastening flange 12, which is provided to be fastened at the end of a longitudinal beam 13 of the vehicle (denoted by dashed lines on FIG. 2) by means of screws, bolts or the like. Initial holes 14 for these screws are located in a lower edge area 15 of the fastening flange 12, below a lower edge 16 of the outer wall 4. As a result, they are readily accessible from outside while mounting the bumper module 1 onto the longitudinal beams. The holes 14 cross the fiber layer 9, which here extends until directly the lower edge of the fastening flange 12.

Additional holes 17 are formed on a segment 18 of the fastening flange 12, which lengthens the inner wall 3 in a flush manner, extending upwardly until beyond the apex 5. The segment 18 is molded onto the cross beam 2 just like the ribs, and melted with the plastic including the matrix 10. In order to create a connection with the cross beam 2 that can bear a load, the segment 18 has a wedge-shaped cross section, with a wall thickness that increases toward the cross beam 2.

In one variant, a lower edge of the inner wall 3 runs at the same height as the lower edge 16 of the outer wall 4 in the central portion 6. The fiber layer 9 then does not extend until the lower edge area 15 of the fastening flange 12, with this edge area 15 instead being created via through injection molding, just like the segment 18.

FIG. 1 shows a block-shaped energy absorber 19 at the lateral segments 8 in front of the outer wall 4. The energy absorber 19 is also created via injection molding on the cross beam 2. As evident from FIG. 2, the energy absorber 19 has a honeycomb structure, with a base plate 20 that extends horizontally outward from the outer wall, and walls 22 that protrude upwardly and downwardly from the base plate, bordering combs 21 that are open at the upper and lower sides of the energy absorber 19.

Lines 23 at which the walls 22 intersect each other each lie parallel to the outer wall 4. This makes it possible, in a single operation, to use only two molding tool parts 24, 25, which are moved toward each other in the direction of the lines 23, to mold the organo sheet blank to the cross beam 2, injection mold the segments 18, ribs 11 and energy absorber 19 and potentially edge areas 15 to the cross beam with the mold closed, and demold the finished bumper module by pulling apart the molding tool parts 24, 25 along the lines 23.

FIG. 3 shows variants of energy absorbers 19 in a top view. The energy absorber 19 on FIG. 3*a* has diamond-shaped combs 21 on a rectangular base area, which is flush with the fastening flange 12 in the longitudinal direction of the vehicle.

On FIG. 3*b*, diagonally oriented walls 22 of the energy absorber 19 extend beyond the fastening flange 12 until the concavely curved intermediate segment 7, and stiffen the latter.

In the variant on FIG. 3*c*, the energy absorber 19 fills the entire space between the cross beam 2 and a bumper skin 26, wherein the expansion by the energy absorber 19 in the longitudinal direction of the vehicle gets increasingly smaller toward the middle of the central portion 6, and can reach zero.

Of course, the combs 21 can also exhibit base areas that are not diamond shaped, e.g., triangular or hexagonal ones.

Figure 4:
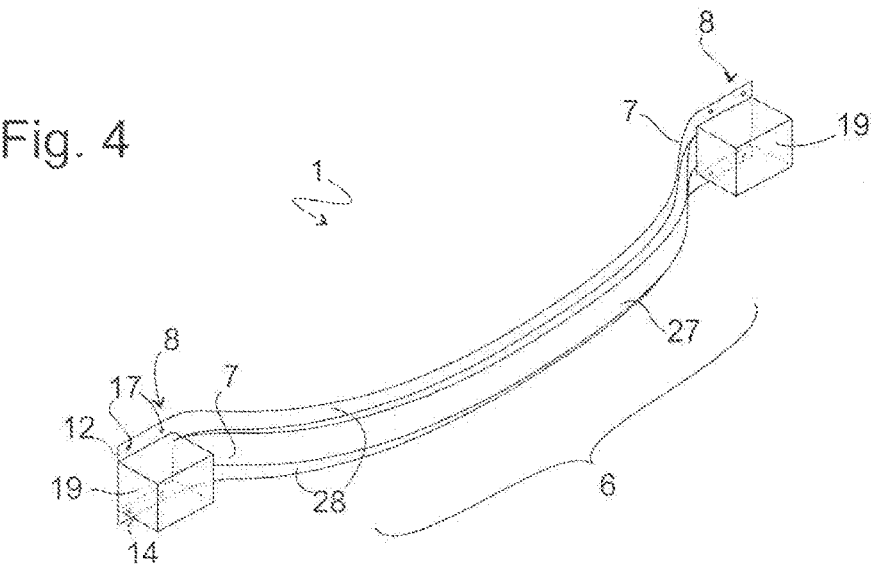
FIG. 4 is a perspective view of a bumper module according to a second embodiment of the present disclosure.
Figure 5A:
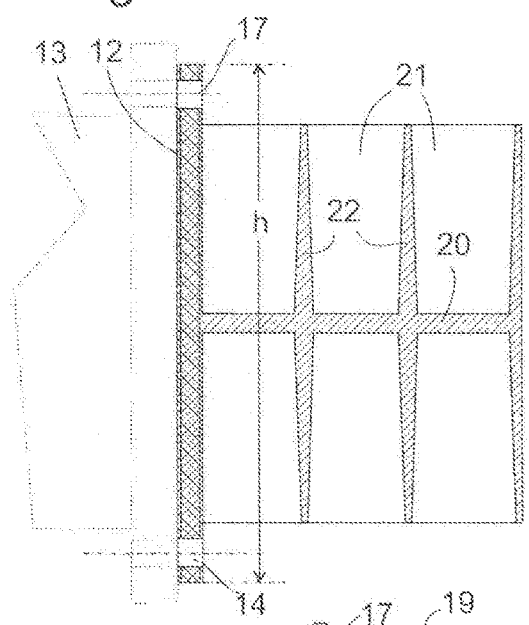
FIGS. 5a-c are sections through the bumper module from FIG. 4.
Figure 5B:
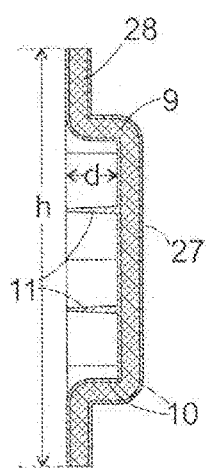
Figure 5C:
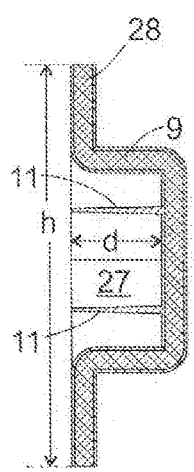

FIGS. 4 and 5 show a second embodiment of the bumper module in a perspective view, as well as in several sections. Here as well, the cross beam 2 is obtained by thermoforming a rectangular organo sheet blank, but the latter is not formed with two walls. Instead, the blank remains unformed in the fastening flanges 12, so as to abut flatly against the ends of the longitudinal beam, and a horizontally running groove 27 open to the vehicle interior is formed in blank in the intermediate segments 7 and central portion 6. Strips 28 that protrude over and under the groove 27 impart a hat-shaped cross section to the cross beam 2. The depth d of the groove 27 increases from the sides to the middle of the cross beam 2. Since the organo sheet is not expanded in the thermoforming process, the vertical dimension h of the bumper module is largest at the fastening flanges 12, as illustrated on FIG. 5*a*, and reaches a minimum in the central portion 6 on FIG. 5*c*, wherein the depth d is the largest.

Forming the hat profile and stiffening ribs 11 inside of the groove 27 requires two molding tool parts, which can move relative to each other in the longitudinal direction of the vehicle.

Two additional molding tool parts are required for molding energy absorbers 19 with upwardly and downwardly open combs 21 onto the fastening flange 12, as depicted on FIG. 5*a*.

Figure 6:
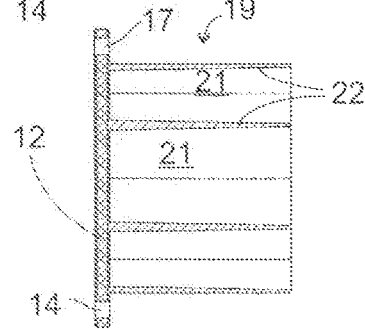
FIG. 6 is a variant of the bumper module of the second embodiment.

In order to reduce the number of required molding tool parts, consideration could be given to an energy absorber 19 with combs 21 open in the longitudinal direction of the vehicle, as shown on FIG. 6. However, as a result of the long demolding path, the walls 22 of the energy absorber 19 reach a high thickness at their end facing the fastening flange 12. As a consequence, and also for reasons of weight and an improved compressibility, preference goes to an energy absorber 19 with a base plate that extends in the longitudinal direction of the vehicle and combs that extend from this base plate in opposite directions, as shown on FIGS. 2 and 5.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A bumper module for a vehicle comprising:
a cross beam having a hat shaped cross-section defining a groove opening in a longitudinal direction of the vehicle having a groove depth that tapers from a middle region of the cross beam outwardly to opposite ends thereof;
a fastening flange disposed at each end of the cross beam to fasten the cross beam to a longitudinal body beam;
a fiber-reinforced plastic layer formed into the groove opening and extending continuously from the cross beam into each of the fastening flanges; and
injection-molded ribs formed in the groove opening.

2. The bumper module according to claim 1, wherein the cross beam extends between the fastening flanges and adjoins flush therewith.

3. The bumper module according to claim 1, wherein the cross beam comprises an outwardly bowed section between the fastening flanges toward the vehicle exterior.

4. The bumper module according to claim 1, further comprising at least one screw hole formed in at least one of the fastening flanges crosses the fiber-reinforced plastic layer.

5. The bumper module according to claim 1, wherein at least one fastening flange further comprises a plastic material segment extending beyond a longitudinal edge of the cross beam.

6. The bumper module according to claim 1, further comprising an energy absorber formed onto an exterior of the fastening flange.

7. The bumper module according to claim 6, wherein the energy absorber comprises a honeycomb structure.

8. The bumper module according to claim 7, wherein combs of the honeycomb structure are open in a vertical direction.

9. A bumper module for a vehicle comprising:
a cross beam including an inner wall joined at a rounded apex with an outer wall to define a downwardly-oriented groove opening, wherein a width of the groove tapers from a lower edge or the cross beam to the rounded apex;
a fastening flange formed by the inner wall at each end of the cross beam to fasten the cross beam to a longitudinal body beam;
a fiber-reinforced plastic layer extending continuously from the cross beam into each of the fastening flanges, wherein the fiber-reinforced plastic layer is bent along a first longitudinal edge of the cross beam so as to extend continuously over the outer wall, the rounded apex and the inner wall; and
injection-molded ribs extending between and joining the inner wall and outer wall.

10. The bumper module according to claim 9, wherein the first longitudinal edge is an upper edge of the cross beam.

11. The bumper module according to claim 9, wherein the cross beam extends between the fastening flanges and adjoins flush therewith.

12. The bumper module according to claim 9, wherein the cross beam comprises an outwardly bowed section between the fastening flanges toward the vehicle exterior.

13. The bumper module according to claim 9, further comprising at least one screw hole formed in at least one of the fastening flanges crosses the fiber-reinforced plastic layer.

14. The bumper module according to claim 9, wherein at least one fastening flange further comprises a plastic material segment extending beyond a longitudinal edge of the cross beam.

15. The bumper module according to claim 9, further comprising an energy absorber formed onto an exterior of the fastening flange.

16. The bumper module according to claim 15, wherein the energy absorber comprises a honeycomb structure.

17. The bumper module according to claim 16, wherein combs of the honeycomb structure are open in a vertical direction.

* * * * *